US005216570A

United States Patent [19]

Yorozuya et al.

[11] Patent Number: 5,216,570

[45] Date of Patent: Jun. 1, 1993

[54] SUSPENSION-TYPE LINE ARRESTER

[75] Inventors: Tsuruo Yorozuya, Showa; Keiji Wakamatsu, Tokyo; Takashi Irie, Kani; Takashi Ohashi, Kasugai, all of Japan

[73] Assignees: Tokyo Electric Power Co., Inc., Tokyo; NGK Insulators, Ltd., Nagoya, both of Japan

[21] Appl. No.: 648,803

[22] Filed: Jan. 31, 1991

[30] Foreign Application Priority Data

Feb. 2, 1990 [JP] Japan .................................. 2-24920

[51] Int. Cl.[5] .............................................. H02H 9/04

[52] U.S. Cl. .................................. 361/117; 361/127; 361/132; 338/21; 174/140 R

[58] Field of Search .................. 361/58, 56, 111, 126, 361/127, 132; 174/140 R, 142, 141 R, 139; 338/20, 21

[56] References Cited

U.S. PATENT DOCUMENTS

| | | | |
|---|---|---|---|
| 4,540,971 | 9/1985 | Kanai et al. | 338/21 |
| 4,675,644 | 6/1987 | Ott et al. | 338/21 |
| 4,736,183 | 4/1988 | Yamazaki et al. | 338/20 |
| 4,761,707 | 8/1988 | Wakamatsu et al. | 361/127 |
| 4,796,149 | 1/1989 | Seike et al. | 361/117 |

FOREIGN PATENT DOCUMENTS 0004348 10/1979 European Pat. Off. .

*Primary Examiner*—Todd E. DeBoer
*Attorney, Agent, or Firm*—Shea & Gould

[57] ABSTRACT

An arresting insulator is provided which includes an insulator body made of an insulative material and a non-linear resistor. The insulator body includes a head for linking the insulator to an adjacent insulator, and a shed formed integrally with the head. The resistor is secured in the insulator body and has a non-linear relation between residual voltage and current. More specifically, the resistor has a characteristic that satisfies the equation:

$$V_{NmA}/H \geqq 300\ V/\text{mm}$$

wherein $V_{NmA}$ is a threshold reference voltage that causes a current of at least N milliamps to start flowing across the resistor to cause the resistor to perform a surge absorbing function. N is an arbitrary value in the range of 1 to 10, and H is the axial length of the resistor along a direction of electric field in millimeters.

7 Claims, 8 Drawing Sheets

SUSPENSION-TYPE LINE ARRESTER

This application claims the priority of Japanese Patent Application No. 2-24920 filed on Feb. 2, 1990 which is incorporated herein by reference.

BACKGROUND OF THE INVENTION

1. Field of the Invention

The present invention relates to an arresting insulator. More particularly, this invention pertains to an arresting insulator which promptly grounds lightning-originated surge voltages in power transmission lines. The insulator suppresses or cuts off the follow current of the surge arrester to prevent ground faults.

2. Description of the Related Art

Conventional long-rod type arresters provided at electric power substations or the like have resistors incorporated within their insulation containers. The resistors consist essentially of zinc oxide. Such resistors have a non-linear varistor voltage-current characteristic (V-I characteristic). The voltage at which such a resistor starts the lightning surge absorbing function can be defined as a voltage that causes a current of N milliamperes or greater (N: being a value between 1 and 10) to start flowing across the resistor. This voltage is called "reference voltage $V_{NmA}$" in association with the value of N.

The axial length of the resistor along the direction of the electric field is defined as H (in millimeters). Thus, conventional resistors have characteristics described by the following equation:

$$V_{NmA}/H=200\ V/\text{mm}$$

The total required length of the resistor is determined by the maximum AC operating voltage and the characteristic of insulation coordination to the lightning surge. Particularly, the set value of the AC operating voltage greatly influences the design length of the resistor. For instance, to give the arresting function to the porcelain shed of a suspension insulator using a resistor with a reference voltage $V_{1mA}$ of 200 V/mm, with N equal to 1, the length of the resistor is calculated as shown in Table 1 given below. In this case, it is assumed that the maximum AC applied voltage is a temporary overvoltage (the maximum design overvoltage) in accordance with the JEC (Standard of the Japanese Electrotechnical Committee) 217.

TABLE 1

| Nominal Voltage U [KV] | Maximum AC Applied Voltage $U_S$ | Required Resistor Length [mm] |
|---|---|---|
| 11-154 | $U_m \times 1/\sqrt{3} \times 2.34$ | $\sqrt{2}\ U_S/(0.2 \times k)$ |
| 187-275 | $U_m \times 1/\sqrt{3} \times 1.69$ | $\sqrt{2}\ U_S/(0.2 \times k)$ |
| 500 | $U_m \times 1/\sqrt{3} \times 1.50$ | $\sqrt{2}\ U_S/(0.2 \times k)$ |

In Table 1, "$U_m$" means the maximum operating voltage in each nominal voltage, and is generally expressed in Japan by the following equations;

$$U \leqq 275\ \text{KV};\ U_m=U\times(1.2/1.1)$$

$$U=500\ \text{KV};\ U_m=525\ \text{KV or } 550\ \text{KV}$$

"k" in Table 1 is a constant set so that the resistor can withstand the temporary overvoltage, and is a compensation coefficient with $V_{NmA}$ as a reference. The value of k varies according to the type of the resistors.

The following is an example of the computation based on Table 1. With the nominal voltage being 66 KV, the required resistor length is 688/k mm. In general, the value of k ranges from 1.02 to 1.30. The result of substituting k=1.30 in the above expression indicates that the required resistor length is at least about 530 mm.

Suppose that a resistor with a length of 530 mm or longer is provided at the head or shed of the standard suspension insulator. In this case, in accordance with the Japanese Electric Committee Technical Report, Vol. 11, No. 220, "Insulation Design of Overhead Power Transmission Line," five or more insulators should be linked and the linked length of the insulators should be 730 mm. However, the length of the insulators in a standard suspension insulator is limited by the length of the metal caps and the length of the metal pins. In practice, the desired length of the non-linear resistors exceeds the space available within conventional suspension insulator string lengths.

SUMMARY OF THE INVENTION

Accordingly, it is a primary object of the present invention to provide a suspended arresting insulator which can utilize non-linear resistors in suspension insulators having a conventional link length.

To achieve the foregoing and other objects and in accordance with the purpose of the present invention, an improved suspended arresting insulator is provided which includes an insulator body made of an insulative material and a non-linear resistor. The insulator body includes a head for linking the insulator to an adjacent insulator, and a shed formed integrally with the head. The resistor is secured in the insulator body and has a non-linear relation between varistor voltage and current. More specifically, the resistor has a characteristic that satisfies the equation:

$$V_{NmA}/H \geqq 300\ V/\text{mm}$$

wherein $V_{NmA}$ is a threshold reference voltage that causes a current of at least N milliamps to start flowing across the resistor to cause the resistor to perform a surge absorbing function. N is an arbitrary value in the range of 1 to 10, and H is the axial length of the resistor along a direction of electric field in millimeters.

According to the present invention, it is preferable that an insulation medium be provided around the resistor.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

The first, second and third preferred embodiments of the present invention will now be described referring to the accompanying drawings.

First Embodiment

Figure 1:
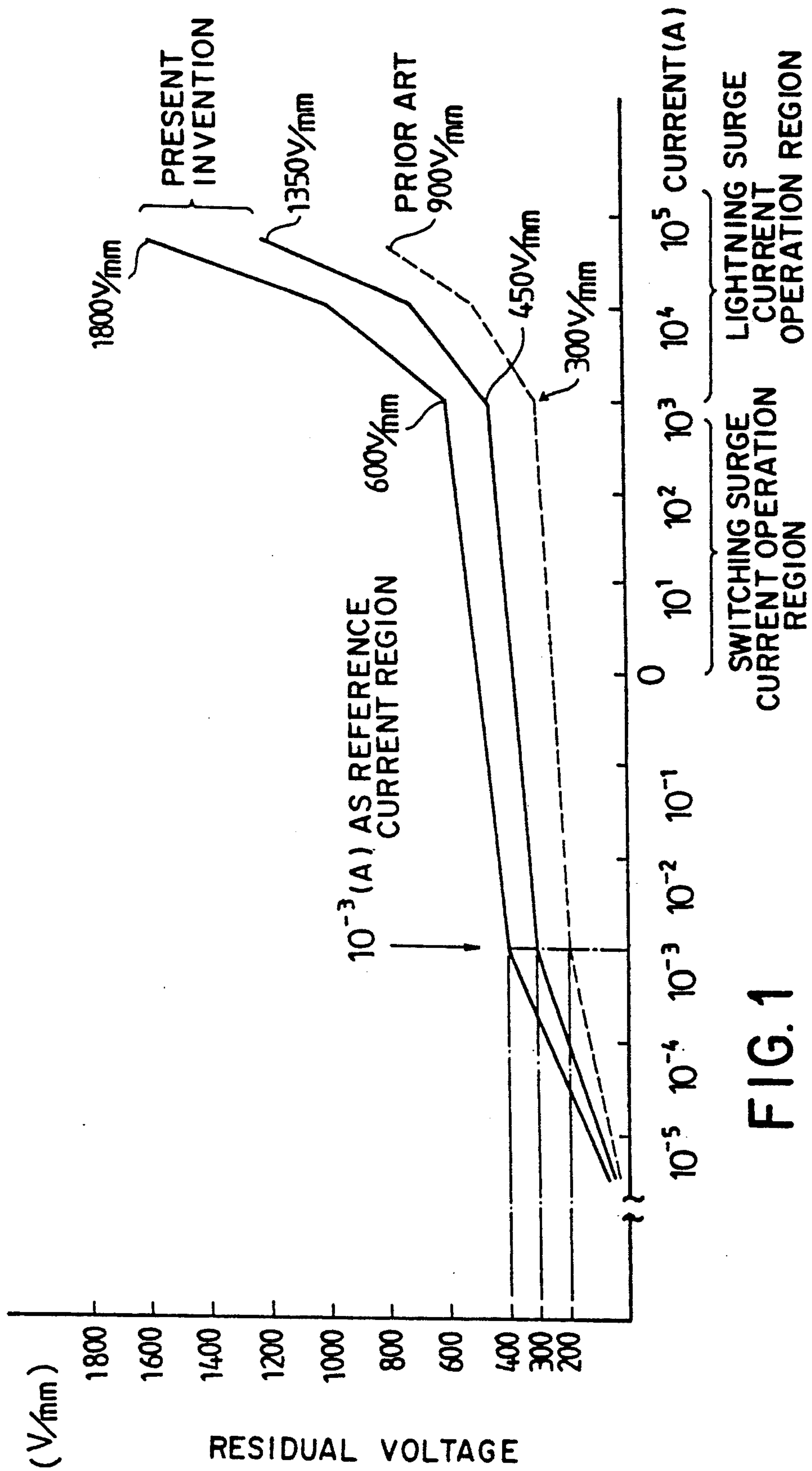
FIG. 1 is a graph representing the relation between a varistor voltage and the current of a non-linear resistor.
Figure 2:
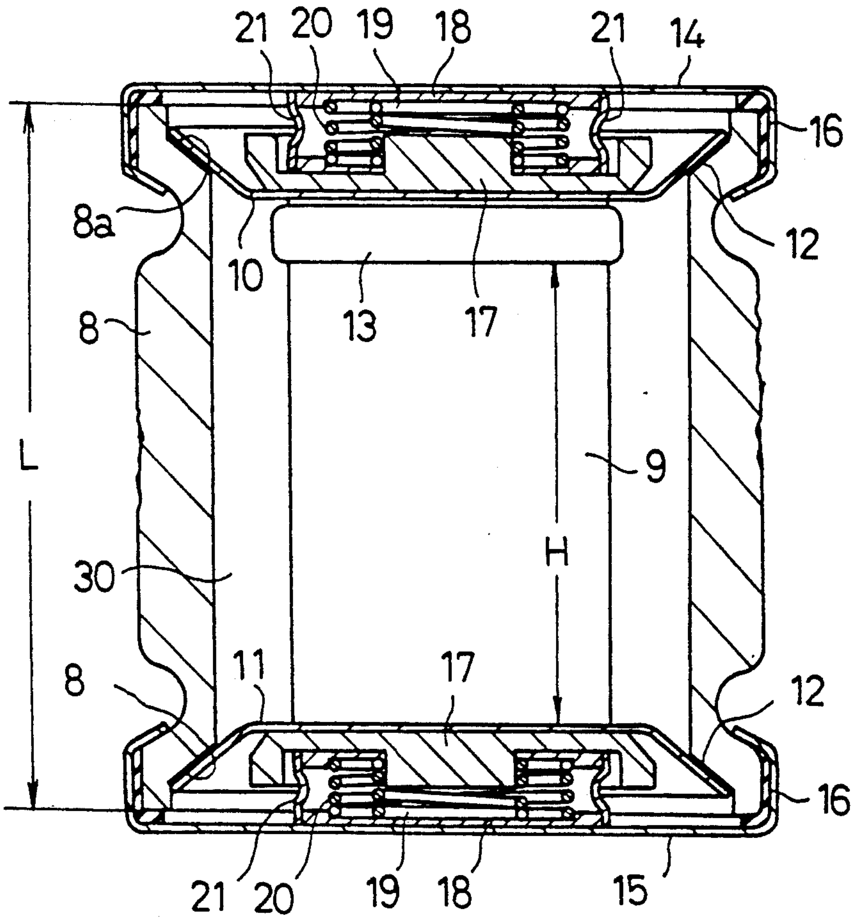
FIG. 2 is an enlarged longitudinal cross section illustrating the non-linear resistor.
Figure 3:
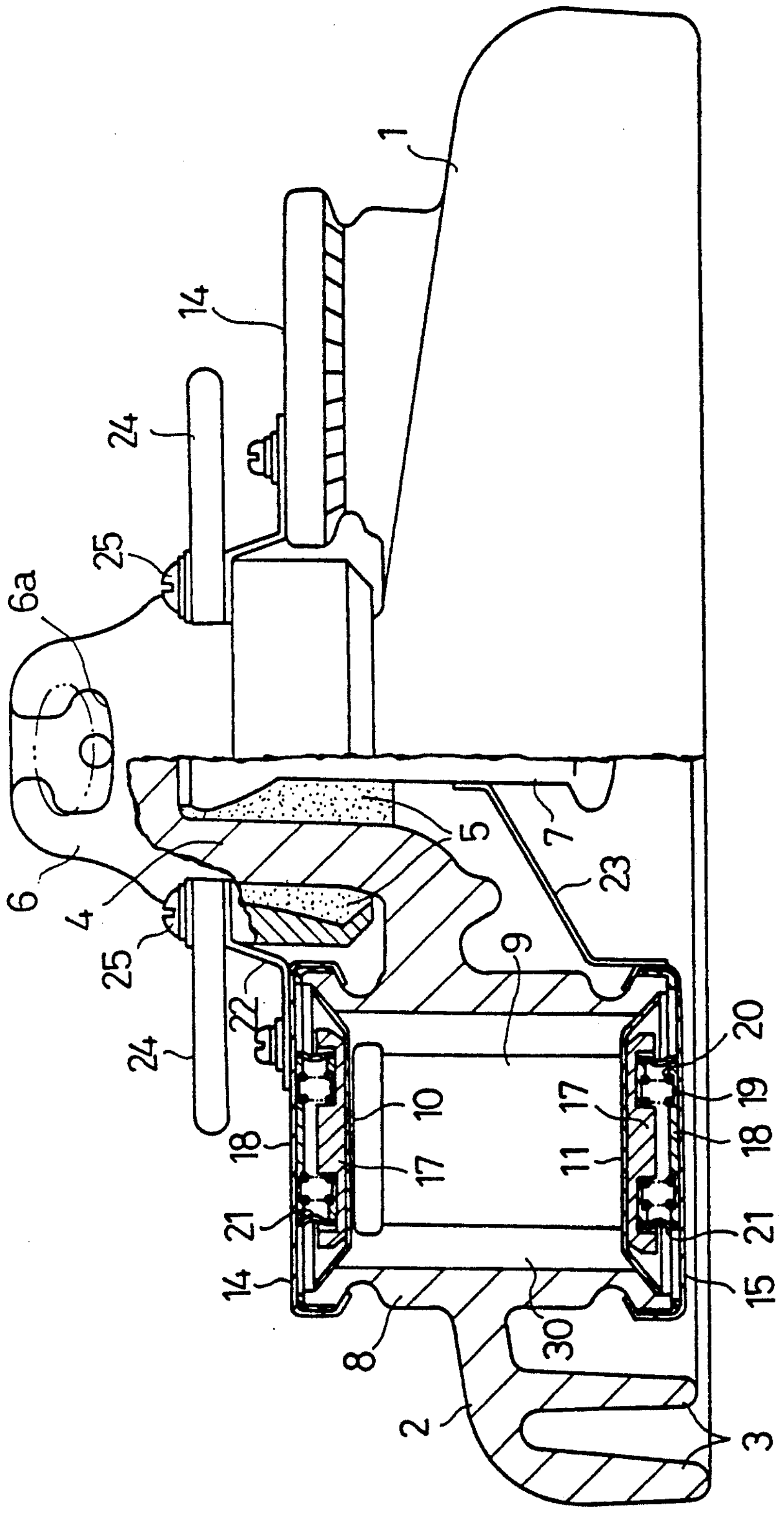
FIG. 3 is a longitudinal half cross section of an arresting insulator.

The first embodiment will now be described referring to FIGS. 1 to 6. As seen in FIG. 3, a plurality of pleats 3 are integrally formed in a concentric manner at the back of a shed 2 of an insulator body 1. A head 4 is integrally formed at the upper center of the shed 2. A metal cap 6 is securely fixed to the outer wall of the head 4 by cement 5. The head 4 is covered by the cap. The cap 6 has a recess 6*a* at the top thereof. The upper portion of a metal pin 7 is inserted into the head 4 and is fixed thereto by cement 5. The lower portion of the pin 7 is fitted detachably in the recess 6*a* of an adjoining insulator disposed below the first.

A pair of vertical cylindrical bore holes 8 are formed integral with the shed 2 at opposite sides of the shed. A resistor 9 is retained in each bore hole 8, as shown in FIG. 2. The resistor 9 is a non-linear type consisting substantially of zinc oxide and having a non-linear voltage-current (V-I) characteristic.

Tapers 8*a* are formed at upper and lower ends of each bore hole 8. Inner seals 10 and 11 also serving as electrodes are adhered to the respective tapers 8*a* with adhesive 12. The adhesive may consist of glass and other conventional materials. A spacer electrode 13 is provided between the resistor 9 and the inner seal 10.

Further, cap-shaped outer seals 14 and 15 are attached to the respective upper and lower ends of each bore hole 8 with packings 16, and fixed there by caulking. A spring seat 17 and a spring cap 18, both serving as electrodes, and coil springs 19 and 20 are provided between the inner seal 10 and an outer seal 14 also serving as an electrode. A conductive ring 21 is formed between the spring seat 17 and the spring cap 18. The spring seat 17, the spring cap 18, the coil springs 19 and 20, and the conductive ring 21 are also disposed in the same manner between the inner seal 11 and another outer seal 15 also serving as an electrode.

As shown in FIG. 3, the outer seals 14 and 15 are electrically connected to the cap 6 and the pin 7 by lead wires 22 and 23, respectively. Arc shields 24 are horizontally supported with bolts 25 at the step portion of the cap 6 in association with the outer seals 14.

Sulfur hexafluoride gas ($SF_6$) is filled in closed space 30 between the resistor 9 and the bore hole 8 under the gauge pressure of 0.2 (kg/cm$^2$). The gauge pressure means the difference between the inside and outside air pressures. The gas provides high insulation in the closed space 30 to prevent a surge current from flashing over along the outer surface of the resistor 9.

The bore hole 8 has the tapers 8*a* formed at the respective ends to relax the potential gradients of the inner seals 10 and 11, and prevent corona discharge. This can therefore prevent the $SF_6$ gas from being chemically decomposed by the corona discharge, and its insulation performance from being deteriorated.

The following will describe how to set the electrical characteristic of the non-linear resistor 9. It is necessary to make the required length of the resistor 9 shorter in order to maintain the length of the suspension insulator string equal to the conventional length and to install the resistor 9 in the shed 2 of the insulator body 1. The present inventors have noted that it is effective to raise the reference voltage of the resistor 9 to satisfy the requirement. The present inventors then found that the resistor 9 in use should have such a characteristic that the reference voltage $V_{NmA}$ divided by the axial length H (mm) of the resistor 9 in the direction of the electric field, i.e., ($V_{NmA}$/H), is equal to or greater than 300 V/mm.

Figure 4:
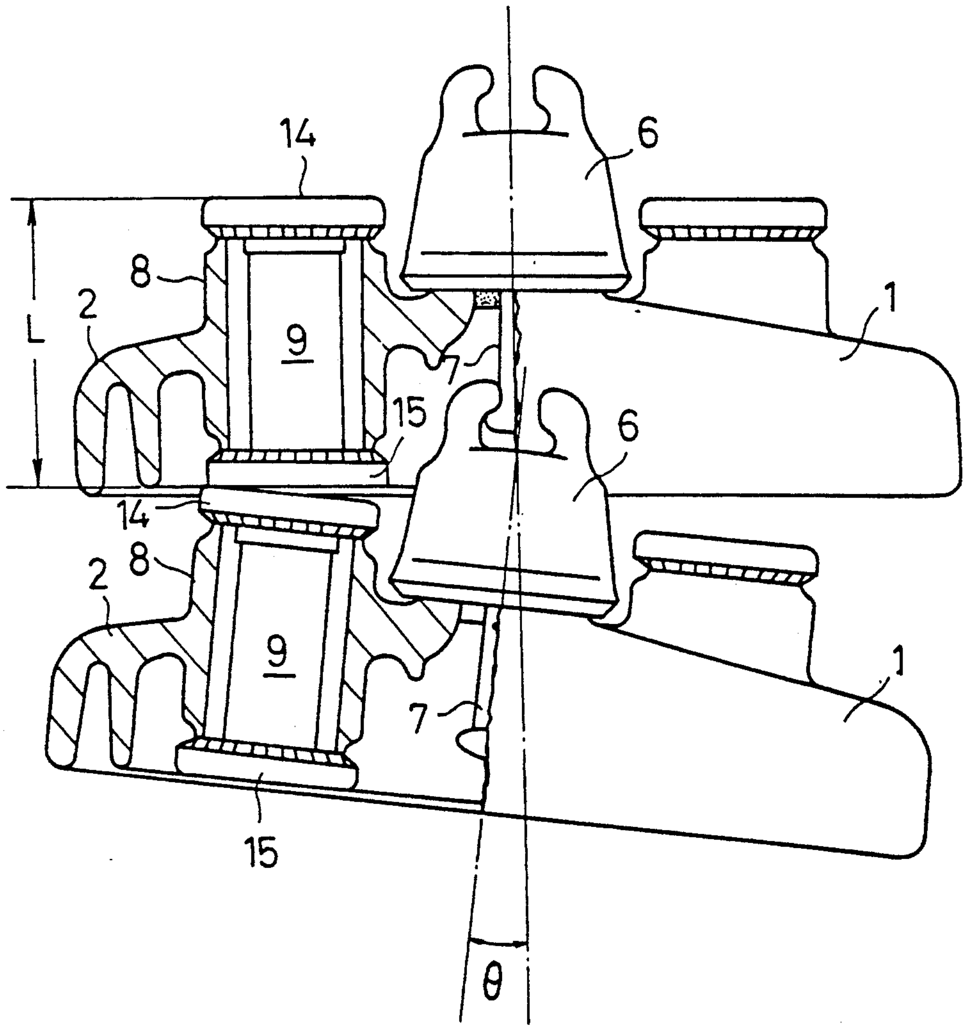
FIG. 4 is a longitudinal half cross section illustrating suspension insulators being connected.

With the suspension insulators connected as shown in FIG. 4, the cap 6 and the pin 7 are swingable with respect to each other. Therefore, the linked insulators will be swung to some extent by winds, the loading fluctuation and horizontal swinging of electric wires.

Suppose that the standard suspension insulators each with the resistor 9 installed in the shed 2 are connected for use and that the nominal voltage is 66 KV. As shown in FIG. 4, when the rotational angle $\theta$ of the engaging portion of each insulator reaches a predetermined angle, the outer seal 15 of the upper insulator and the outer seal 14 of the lower insulator contact or collide with each other.

Figure 5:
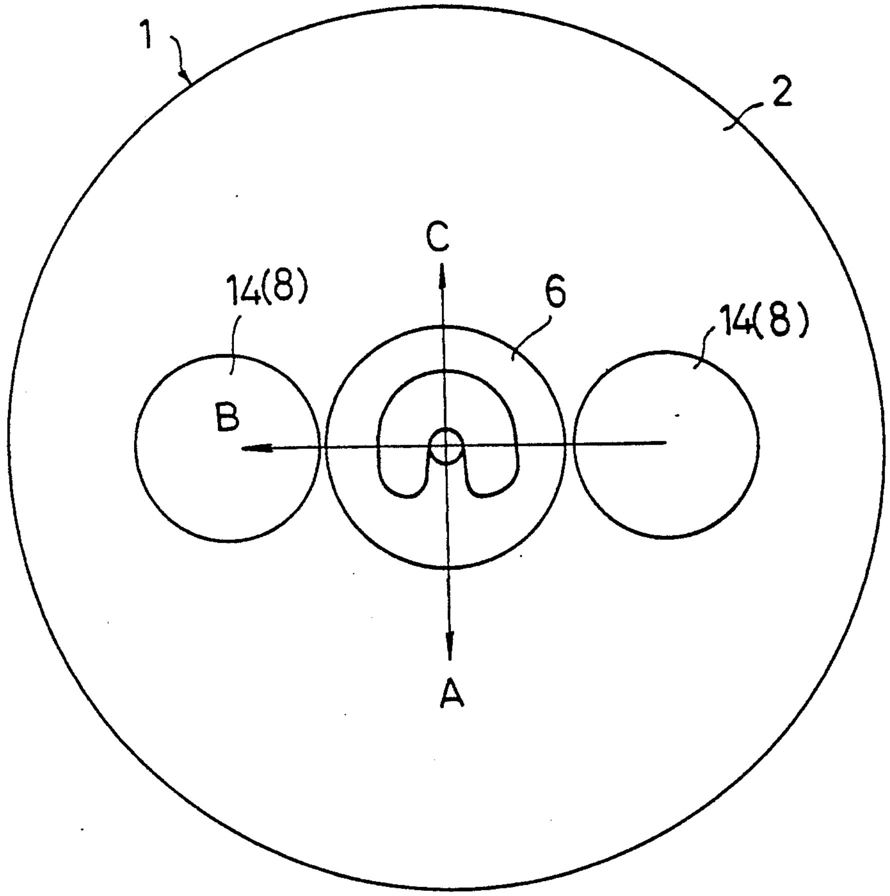
FIG. 5 is a plan view of the suspension insulator.
Figure 6:
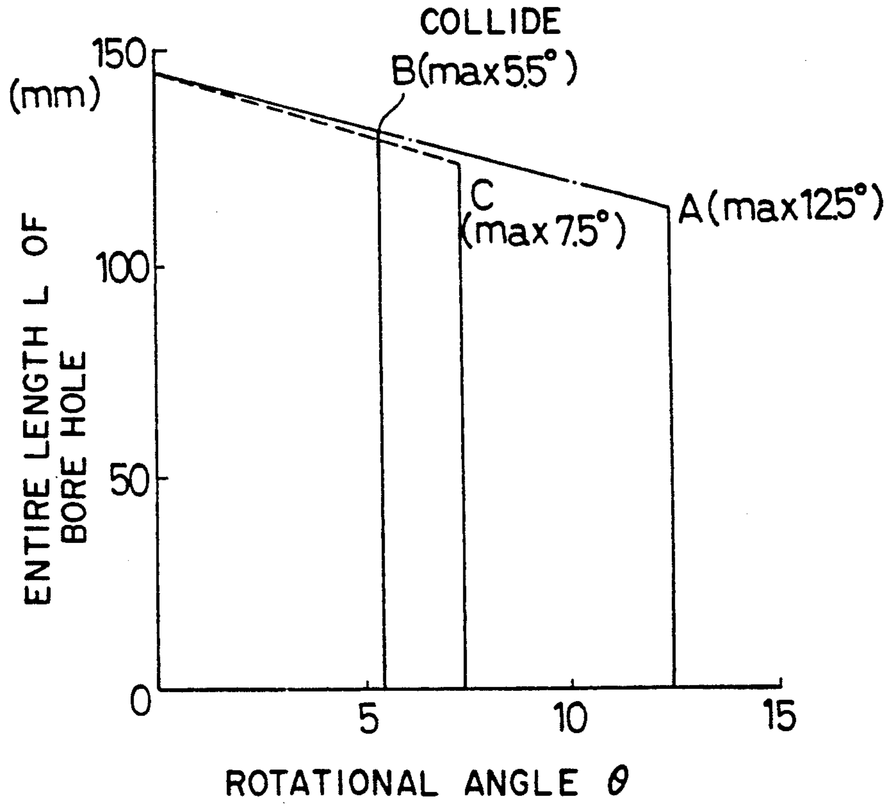
FIG. 6 is a graph representing the relation between the rotational angle of the suspension insulator and the entire length of a cylindrical bore hole.

If the suspension insulator swings towards the arrows A, B, and C in FIG. 5, the bore holes 8 of the upper and lower insulators will collide at different rotational angles $\theta$. With the entire length of the bore hole 8 being L (mm), the individual rotational angles $\theta$ and the L have the relation as shown in FIG. 6. According to the standard suspension insulator of this embodiment, the distance from the center of the bore hole 8 to the center of the insulator is 108 mm, the outer diameter of the bore hole 8 is 90 mm, and the diameter of the shed 2 is 420 mm.

As apparent from the graph in FIG. 6, the collisions occur most frequently when the insulator swings in the direction B. With the aforementioned structured bore hole 8, given that the distance from the ends of the resistor 9 to the outer faces of the respective outer seals 14 and 15, i.e., the sum of the distance for the upper electrode and the distance for the lower electrode is 3 mm, the acceptable length of the resistor is (L−3) mm.

With P being the number of the insulators to be connected, P is five for the nominal voltage U of 66 KV. Therefore, the total length $H_Z$ of the resistors out of the entire linked length of the insulators is represented as follows:

$$\begin{aligned} H_Z &= P \times (L - 3) \\ &= 5(L - 3) \text{ [mm]} \end{aligned}$$

If a temporary overvoltage is used as the highest applied voltage $U_S$, and defined as a designed voltage of the resistor 9, the reference voltage $V_{NmA}$ per allowable unit length of the resistor is expressed as follows:

$$V_{NmA} \geqq \sqrt{2} \times U_S/\{P \times (L-3) \times k\}$$

$$\geqq (\sqrt{2} \times 72 \times 1/\sqrt{3})\,k_2/\{5 \times (L-3) \times k\}\ [KV_{peak}/\text{mm}]$$

where $$U_S = U_m \times 1/\sqrt{3} \times k_2$$

$$U_m = 66 \times (1.2/1.1) = 72$$

$$k_2 = 2.34$$

When L is 67 mm and k is 1.02 in the equation above, $V_{NmA}$ is given as follows:

$$V_{NmA} \geqq 0.403\ [KV_{peak}/\text{mm}] = 403\ [V_{peak}/\text{mm}]$$

With L being 67 mm and k being 1.30, $V_{NmA}$ is given as follows:

$$V_{NmA} \geqq 0.316\ [KV_{peak}/\text{mm}] = 316\ [V_{peak}/\text{mm}]$$

In this case, the temporary overvoltage is regarded as the designed voltage. The increase in the overvoltage of sound phase due to single phase ground fault with respect to the ground voltage may be taken as the designed voltage. In this case, the values given in Table 2 below are generally used for $k_2$ that determines the value of $U_s$.

TABLE 2

| U [KV] | $U_S$ [KV] $= U_m \times 1/\sqrt{3} \times k_2$ |
|---|---|
| 11-154 | $U_m \times 1/\sqrt{3} \times \sqrt{3}$ |
| 187-275 | $U_m \times 1/\sqrt{3} \times 1.3$ |
| 500-525 | $U_m \times 1/\sqrt{3} \times 1.25$ |
| 550 | $U_m \times 1/\sqrt{3} \times 1.20$ |

According to this embodiment, as "U" is considered to be 66 KV, $k_2 = \sqrt{3}$ is applied to the above equation of $V_{NmA}$ based on Table 2. Then, $$V_{NmA} \geqq (\sqrt{2} \times 72 \times 1/\sqrt{3})\,k_2/\{5 \times (L-3) \times k\}$$

$$\geqq 0.3\ [KV_{peak}/\text{mm}] = 300\ [KV_{peak}/\text{mm}]$$

where $$L = 67\ \text{mm}$$

$$K_2 = \sqrt{3}$$

$$k' = 1.02.$$

As described above, according to this embodiment, setting the reference voltage of the resistor to 300 V/mm can suppress the length of the resistor to a predetermined length. As a result, the resistor can be incorporated in a suspension insulator of a specified size. Even if the suspension insulator string swings in either direction, the resistor retaining portions will not collide with each other. Further, it is unnecessary to elongate the metal link fittings or provide a complex arrangement in order to avoid such collisions.

Second Embodiment

This embodiment, like the first embodiment, is intended to make the resistor 9 shorter while increasing the reference voltage $V_{NmA}$. Another key point of the second embodiment is to set the length of the resistor 9 equal to or less than the thickness of the shed 2 or head 4 of the suspension insulator in order to prevent linked suspension insulators from being influenced by their swinging. For such a resistor 9, the reference voltage $V_{NmA}$ is set as described below.

Figure 7:
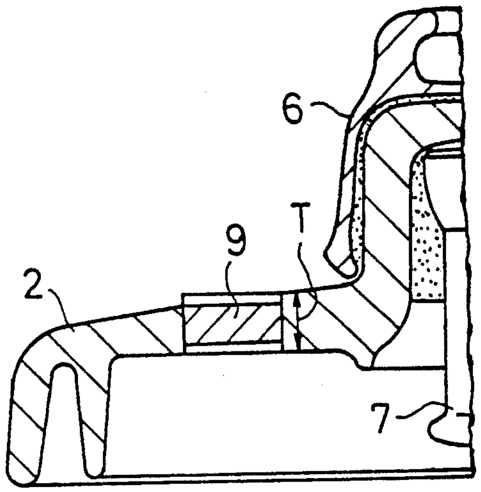
FIGS. 7 and 8 are longitudinal half cross sections illustrating different examples of the suspension insulator.

FIG. 7 illustrates a modification of the suspension insulator which has the resistor 9 embedded in the shed 2. The insulation layer of the shed 2 is made of porcelain and its thickness T is 20 mm. With this arrangement and the nominal voltage being 66 KV, the reference voltage $V_{NmA}$ is given by the following equation.

$$V_{NmA} \geqq \{(\sqrt{2} \times U_S)/(P \times k)\} \times 1/T$$

$$\geqq \{(\sqrt{2} \times 72 \times (1/\sqrt{3} \times k_2/(5 \times k)\} \times 1/T$$

$$\geqq 1\ [KV_{peak}/\text{mm}]$$

where $$k_2 = \sqrt{3}$$

$$k = 1.02.$$

According to this embodiment, the overvoltage of sound phase due to single phase ground fault is used as $U_s$ and $k_2$ is set to $\sqrt{3}$. If the rising coefficient of the temporary overvoltage is used for $U_s$ as per the first embodiment, however, $V_{NmA}$ should be higher than the above-computed value.

Figure 8:
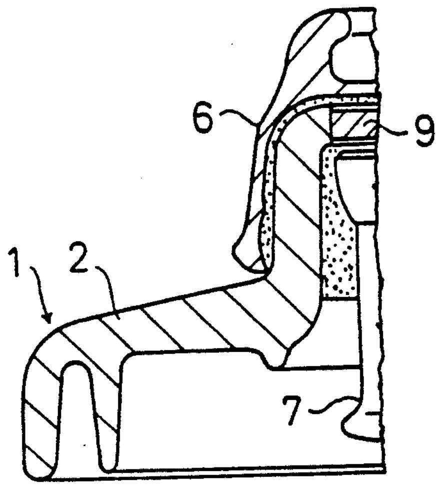

Although the description of the second embodiment has been given with reference to an insulator made of porcelain, this embodiment may also be applied to a glass insulator or an organic insulator. In addition, the resistor 9 may be incorporated in the head 4, as shown in FIG. 8.

Third Embodiment

According to the first and second embodiments, the reference voltage $V_{NmA}$ of the resistor 9 is set higher than the conventional value, 200 $V_{peak}$/mm. As a result, the varistor voltage over the lightning surge current region generally becomes high; it has exceeded 1 KV/mm and reached 2 KV/mm. Accordingly, flashover may occur along the outer wall of the resistor 9 in the operational region of the lightning surge current (i.e. in the kiloampere(s) to tens of kiloamperes range).

In a suspension insulator using the conventional type of resistor, the closed space 30 (see FIGS. 2 and 3) in the bore hole 8 is normally filled with clean dry air. Even though the gauge pressure of the air is equal to or less than a predetermined value, the flashover which may be caused by the residual voltage in the lightning surge current region can effectively be prevented. The conventional type resistor 9 could therefore perform its intrinsic function.

For instance, the insulating strength of air in an ideal equal electric field is approximately 2 to 3 KV/mm in accordance with the "Dielectric Test Handbook" (issued by the Institute of Electric Engineers of Japan). Even if an unequal electric field is generated by the electrodes at the ends of the resistor and electrode-constituting elements (made of metal or the like) located at the vicinity of the electrode and having a potential, the insulating strength shall not fall below about 600 to 800 V/mm in accordance with the Electric Committee Technical Report, second volume No. 220, also issued by the Institute of Electrical Engineers of Japan. In light of the degree of the design freedom and the shielding of an electric field, no problems are raised by filling the closed space 30 with air.

When the above-described resistor having a high reference voltage is used, however, the varistor voltage of the resistor in the lightning surge current region is greater by 50% than that of the conventional type of resistor or over 1.8 KV/mm. In addition, the varistor voltage may exceed the insulating strength of air under the ideal equal electric field. Accordingly, such a resistor does not sufficiently perform the arresting function and flashover may occur in the air. Further, a narrower design freedom around the resistor will raise a problem of corona-originated degradation of the resistor or the like. Furthermore, there is a new difficulty such that the electric field shielding level should come to that of the ideal model.

The third embodiment aims at preventing the flashover or suppressing the occurrence of the flashover as much as possible. For this purpose, a material having an excellent dielectric strength is arranged around the resistor 9 in this embodiment. As such a material, there are following insulation media:

(a) Low melting point inorganic glass essentially consisting of lead oxide and having a melting point of 500° C. or below (12 KV/mm)
(b) $SF_6$ gas (8.9 KV/mm)
(c) $CO_2$ gas (3.1 KV/mm)
(d) $N_2$ gas (3.3 KV/mm)
(e) Silicone resin (25 KV/mm)
(f) Epoxy resin (19 KV/mm)
(g) Ethylene propylene diene monomer (EPDM) (20 KV/mm)

The values in the brackets are the effective values of the AC withstand voltage in a case where the equal electric field can be provided. When the insulation medium is gas, its dielectric strength is indicated by the measured value under the conditions of the gauge pressure of 0 kg/cm$^2$ and the normal temperature. Although the dielectric strength is expressed by the effective value of an AC withstand voltage, with the peak voltage regarded as the lightning impulse withstand voltage, the value of this voltage may be used as an index.

Figure 9:
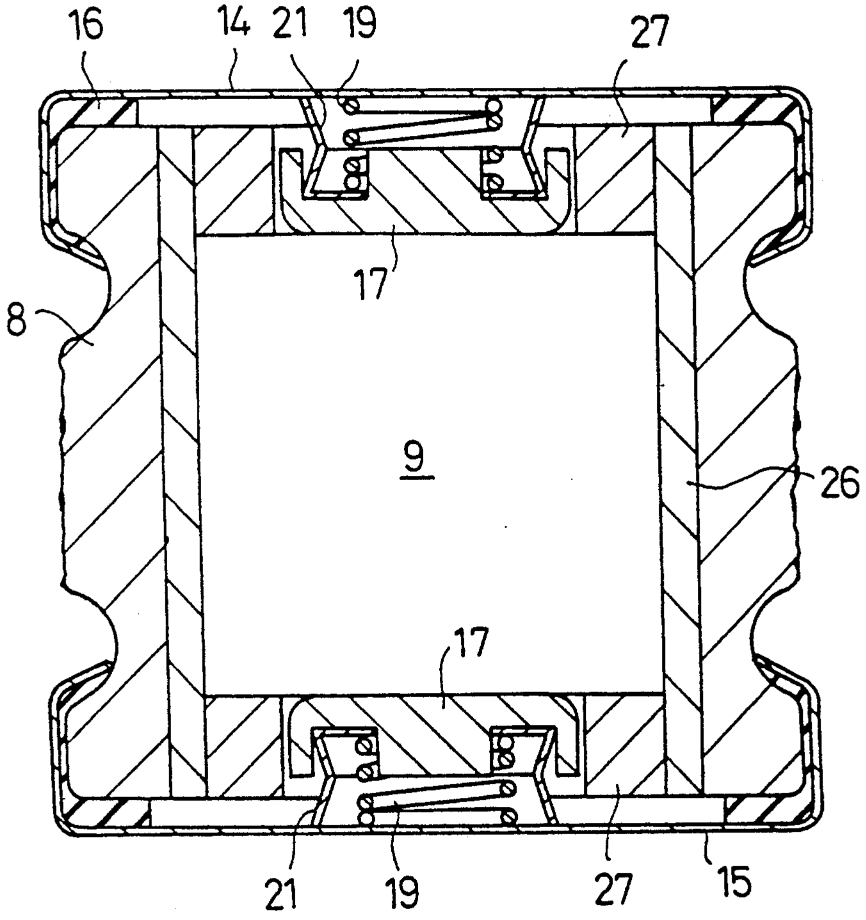
FIG. 9 is a longitudinal cross section illustrating the vicinity of the resistor of a further example of the suspension insulator.

FIG. 9 exemplifies a suspension insulator having an insulation medium provided around the resistor 9. The varistor voltage of the resistor used in this insulator is 1.5 times greater than that of the conventional type resistor having the reference voltage $V_{NmA}=200$ V/mm (see FIG. 1). To prevent the aforementioned flashover, an inorganic insulation layer 26 is formed between the inner wall of the bore hole 8 and the outer wall of the resistor 9.

The insulation layer 26 is made of low melting point inorganic glass having a melting point of 500° C. This layer 26 is formed by filling fluid glass around the resistor 9 then solidifying it. Since the insulation layer 26 provides a remarkably excellent insulation compared with the air, no flashover will occur even when the reference voltage $V_{NmA}$ of the resistor 9 is set to a high value of 400 V/mm. It is to be noted that insulation rings 27 made of a calcinated porcelain substance are connected to the upper and lower ends of the resistor 9. These rings 27 hold the resistor 9 in the bore hole 8.

The inorganic glass may be replaced with an epoxy resin having higher dielectric strength. In this case, the flashover can be prevented even if the reference voltage $V_{NmA}$ is set to a high value of 500 V/mm. In addition, the bore hole portion 8 may be made lighter and smaller.

Although only three embodiments of the present invention have been described above, it should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given above, but may be modified within the scope of the appended claims.

We claim:

1. An arresting insulator comprising:

an insulator body made of an insulative material, the insulator body including a head for linking the insulator to an adjoining insulator, and a shed formed integrally with the head;

a non-linear resistor provided in the insulator body, wherein said shed has a bore hole to retain said resistor, and wherein the resistor has a non-linear relation between varistor voltage and current, the resistor having a characteristic that satisfies the equation:

$$V_{NmA}/H \geqq 300\ V/\text{mm}$$

wherein $V_{NmA}$ is a threshold reference voltage that causes a current of at least N milliamps to start flowing across the resistor to cause the resistor to perform a surge absorbing function, wherein N is an arbitrary value in the range of 1 to 10, and H is the axial length of the resistor along a direction of electric field in millimeters; and an insulation medium disposed between an inner wall of said bore hole and said resistor, wherein said insulation medium is a gas having the dielectric strength of at least 3.1 KV/mm, and wherein the dielectric strength of said insulation medium is expressed by the effective value of an AC withstand voltage, measured under normal pressure and normal temperature.

2. An arresting insulator according to claim 1, wherein the resistor consists essentially of zinc oxide.

3. An arresting insulator according to claim 1, wherein said insulation medium is a gas selected from the group consisting of sulfur hexafluoride, carbon dioxide and nitrogen, the pressure of the gas being at least as high as the atmospheric pressure.

4. An arresting insulator according to claim 1, wherein the thickness of the insulator body is at least as great as the length of the resistor.

5. An arresting insulator comprising:

an insulator body made of a porcelain material, the insulator body having a head provided to link an insulator thereof to an adjoining insulator, a shed formed integrally with the head, and a bore hole;

a resistor retained within the bore hole, the resistor consisting essentially of zinc oxide and having a non-linear relation between varistor voltage and current; and an insulation medium filled between an inner wall of the bore hole and the resistor, the insulation medium being sulfur hexafluoride gas having a gas pressure at least as high as the atmospheric pressure, and wherein the resistor has characteristics that satisfy the equation:

$$V_{NmA}/H \geqq 300 \text{ V/mm}$$

wherein $V_{NmA}$ is a threshold reference voltage that causes a current of at least N milliamps to start flowing across the resistor to cause the resistor to perform a surge absorbing function, wherein N is an arbitrary value in the range of 1 to 10, and H is the axial length of the resistor along a direction of electric field in millimeters.

6. An arresting insulator comprising:

an insulator body made of an insulative material, the insulator body including a head for linking the insulator to an adjoining insulator, and a shed formed integrally with the head; and a non-linear resistor provided in the insulator body, the resistor having a non-linear relation between varistor voltage and current, the resistor having a characteristic that satisfies the equation $$V_{NmA}/H \geqq 300 \text{ V/mm}$$

wherein $V_{NmA}$ is a threshold reference voltage that causes a current of at least N milliamps to start flowing across the resistor to cause the resistor to perform a surge absorbing function, wherein N is an arbitrary value in the range of 1 to 10, and H is the axial length of the resistor along a direction of electric field in millimeters, and wherein the thickness of the insulator body is at least as great as the length of the resistor.

7. An arresting insulator according to claim 6, wherein the resistor consists essentially of zinc oxide.

* * * * *